(12) United States Patent
Terada

(10) Patent No.: US 9,900,563 B2
(45) Date of Patent: Feb. 20, 2018

(54) OPTICAL UNIT AND PROJECTOR INCLUDING THE SAME

(71) Applicant: Konica Minolta, Inc., Tokyo (JP)

(72) Inventor: Masahiro Terada, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/536,891

(22) PCT Filed: Apr. 7, 2015

(86) PCT No.: PCT/JP2015/060830
§ 371 (c)(1),
(2) Date: Jun. 16, 2017

(87) PCT Pub. No.: WO2016/098364
PCT Pub. Date: Jun. 23, 2016

(65) Prior Publication Data
US 2018/0020196 A1 Jan. 18, 2018

(30) Foreign Application Priority Data

Dec. 18, 2014 (JP) .................................. 2014-256489

(51) Int. Cl.
*H04N 9/31* (2006.01)

(52) U.S. Cl.
CPC ........... *H04N 9/3102* (2013.01); *H04N 9/315* (2013.01); *H04N 9/317* (2013.01)

(58) Field of Classification Search
CPC ........ H04N 9/31; H04N 9/3102; H04N 9/315; H04N 9/317; H04N 5/74; H04N 9/69; H04N 5/66; G02B 26/08; G02B 26/0833; G02F 1/13; G02F 1/133
USPC ....... 348/744, 755–757, 764, 770, 771, 781, 348/804; 353/30, 33, 81; 359/438, 359/485.06, 489.08, 489.09, 831, 833
See application file for complete search history.

(56) References Cited

U.S. PATENT DOCUMENTS 6,454,417 B1 9/2002 Takamoto et al.
6,840,634 B1 1/2005 Chang
(Continued)

OTHER PUBLICATIONS

Texas Instruments, "DLP Tilt & Roll Pixel Architecture and DLP IntelliBrightTM", [online], [retrieved Oct. 3, 2014], Internet <URL:http://www.dlp.com/pico-projector/pico-product-developers/2trp-chip.aspx> (3 pages).
(Continued)

*Primary Examiner* — Sherrie Hsia
(74) *Attorney, Agent, or Firm* — Osha Liang LLP

(57) ABSTRACT

An optical unit includes a digital micromirror device in which each of micro-mirrors is driven biaxially in ON/OFF control, a first prism directs illumination light to the digital micromirror device, a second prism including an OFF-light reflecting surface reflects OFF light reflected from the micro-mirrors in an OFF state and transmits ON light reflected from the micro-mirrors in an ON state, and a third prism emits the ON light incident from the second prism toward a projection side. The micro-mirrors reflect the OFF light so that an optical axis of the OFF light is directed away from a projection-optical-axis plane including an optical axis of the ON light and an optical axis of the illumination light.

16 Claims, 11 Drawing Sheets

(56) References Cited

U.S. PATENT DOCUMENTS

2003/0151834 A1\* 8/2003 Penn ..................... G02B 5/04
  359/833
2010/0165470 A1\* 7/2010 Davis ................. G02B 26/0833
  359/626

OTHER PUBLICATIONS

International Search Report issued in corresponding International Application No. PCT/JP2015/060830 dated Jun. 23, 2015, and English translation thereof (6 pages).
Written Opinion issued in corresponding International Application No. PCT/JP2015/060830 dated Jun. 23, 2015 (3 pages).

\* cited by examiner ions relates to an optical unit having a digital micromirror device in which micro-mirrors are each driven biaxially and also relates to a projector including the same.

OPTICAL UNIT AND PROJECTOR INCLUDING THE SAME

TECHNICAL FIELD

The present invention relates to an optical unit having a digital micromirror device in which micro-mirrors are each driven biaxially and also relates to a projector including the same.

BACKGROUND

Conventional optical units are disclosed in Patent Literatures 1 and 2, respectively. The optical unit of Patent Literature 1 is mounted to a projector and includes a digital micromirror device, a first prism, a second prism, and a third prism. The digital micromirror device is a reflective image display element having an image display plane composed of a plurality of minute micro-mirrors.

The first prism has a reflecting surface that reflects illumination light, and the illumination light reflected from the reflecting surface is directed to the digital micromirror device. The digital micromirror device forms an image by illumination light intensity modulation in which a surface of each of the micro-mirrors is tilted by ON/OFF control. In the ON/OFF control, each of the micro-mirrors is driven uniaxially. A tilt angle of the micro-mirror in an ON state differs from a tilt angle of the micro-mirror in an OFF state.

The second prism has a total reflection surface that transmits ON light reflected from the ON-state micromirrors while totally reflecting OFF light reflected from the OFF-state micro-mirrors. The ON light transmitted by the total reflection surface is incident on the third prism. The third prism emits the ON light incident from the second prism toward an image projection side. In this way, the image is projected. Here, an optical axis of the ON light reflected from the digital micromirror device is disposed on a center plane thicknesswise of the first prism, the second prism, and the third prism. An optical axis of the OFF light reflected from the digital micromirror device is disposed on a center plane thicknesswise of the first prism and the second prism.

When incident on a projection lens, the OFF light (unwanted light) that is not used for a projection image causes ghost light. With the OFF light incident on the projection lens, a local temperature rise is caused to the projection lens, thereby degrading imaging performance of the projection lens. The projection image thus has lower contrast. According to the optical unit of Patent Literature 1, the OFF light reflects off the total reflection surface of the second prism for emission in a direction different from that of the ON light. The OFF light is thus prevented from being emitted toward the image projection side, whereby a projection image can be prevented from having lower contrast that might otherwise be caused by the OFF light.

Non-Patent Literature 1 discloses a digital micromirror device (Tilt & Roll Pixel DMD) in which micro-mirrors are each driven with respect to two orthogonal axes. In this digital micromirror device, the micro-mirrors reflect OFF light so that an optical axis of the OFF light is directed away from a plane including an optical axis of ON light and an optical axis of illumination light. By being mounted with the biaxial-control digital micromirror device, the optical unit of Patent Literature 1 or 2 can thus improve brightness of its projection image.

CITATION LIST

Patent Literature

Patent Literature 1: U.S. Pat. No. 6,454,417
Patent Literature 2: U.S. Pat. No. 6,840,634

Non-Patent Literature

Non-Patent Literature 1: TEXAS INSTRUMENTS, "DLP Tilt & Roll Pixel Architecture and DLP IntelliBright™", [online], [retrieved Oct. 3, 2014], Internet <URL:http://www.dlp.com/pico-projector/pico-product-developers/2trp-chip.aspx>

There is a market demand for size reduction of optical units that are mounted to projectors. In cases where the biaxial-control digital micromirror device is mounted to the optical unit of Patent Literature 1 or 2, the optical axis of the ON light is disposed on a center plane thicknesswise of the second prism, while the optical axis of the OFF light is disposed away from the center plane. For this reason, the second prism has an increased thickness, and the optical unit is increased in size.

SUMMARY

One or more embodiments of the present invention provide an optical unit that can be reduced in size and a projector using the same.

An optical unit of one or more embodiments of the present invention may include:

a digital micromirror device configured to form an image by such illumination light intensity modulation that in an image display plane formed of a plurality of micro-mirrors, a surface of each of the micro-mirrors is tilted by ON/OFF control, each of the micro-mirrors being driven biaxially in the ON/OFF control;

a first prism configured to direct illumination light to the digital micromirror device;

a second prism including an OFF-light reflecting surface configured to reflect OFF light reflected from the micromirrors in an OFF state and to transmit ON light reflected from the micro-mirrors in an ON state; and a third prism configured to emit the ON light incident from the second prism toward a projection side, wherein the micro-mirrors reflect the OFF light so that an optical axis of the OFF light is directed away from a projection-optical-axis plane including an optical axis of the ON light and an optical axis of the illumination light, the second prism's first area on one side of the projection-optical-axis plane is formed longer along a line normal to the projection-optical-axis plane than the second prism's second area on another side of the projection-optical-axis plane, and the first area includes the optical axis of the OFF light.

In one or more embodiments' optical unit having the above structure, a light ray along the optical axis of the OFF light passing through the second prism may be emitted from an end face of the second prism that is different from the second prism's end face facing the projection-optical-axis plane.

In one or more embodiments' optical unit having the above structure, the following conditional expression (1) may be satisfied:

$$\theta a \geq \theta 1 \geq \theta b \tag{1}$$

where:

$$\theta a = \sin^{-1}(1/n) - \sin^{-1}\{\sin(\alpha + \theta F - 2\cdot\beta/n\};$$

$$\theta b = \sin^{-1}\sqrt{[\{n^2 - 1 + \cos^2(\alpha - \theta F)\cdot\cos^2(2\cdot\gamma)\}/\{n^2 - \cos^2(\alpha - \theta F)\cdot\sin^2(2\cdot\gamma)\}] - \sin^{-1}\sqrt{[(n^2 - 1)/\{n^2 - \cos^2(\alpha - \theta F)\cdot\sin^2(2\cdot\gamma)\}]};$$

$$\theta F = \sin^{-1}(1/2\cdot F);$$

α is an angle formed by the optical axis of the light incident on the digital micromirror device and a line normal to the digital micromirror device;

β is an angle formed by a line normal to each of the ON-state micro-mirrors and the line normal to the digital micromirror device;

γ is an angle formed by a line normal to each of the OFF-state micro-mirrors and the line normal to the digital micromirror device;

n is a refractive index of the second prism;

F is an F-number; and

θ1 is an angle formed by the line normal to the digital micromirror device and a line normal to the OFF-light reflecting surface.

In one or more embodiments' optical unit having the above structure, the first prism may include an illumination light reflecting surface configured to reflect the illumination light and to transmit the ON light, and the following conditional expression (2) may be satisfied:

$$\theta c \geq \theta 2 \geq \theta d \qquad (2)$$

where:

$$\theta c = \sin^{-1}(1/n1) + \sin^{-1}\{\sin(\alpha - \theta F - 2\cdot\beta)/n1\};$$

$$\theta d = \sin^{-1}(1/n1) - \sin^{-1}\{\sin(\alpha - \theta F)/n1\};$$

n1 is a refractive index of the first prism; and

θ2 is an angle formed by the line normal to the digital micromirror device and a line normal to the illumination light reflecting surface.

In one or more embodiments' optical unit having the above structure, the illumination light incident on the first prism may pass through the first prism, the third prism, and the second prism in this order to be directed to the micro-mirrors, the ON light reflected from the micro-mirrors may be incident on the third prism through the second prism and reflects off an ON-light reflecting surface of the third prism for emission toward the projection side, and the following conditional expression (3) may be satisfied:

$$\theta e \geq \theta 3 \geq \theta h \qquad (3)$$

where:

$$\theta e = \sin^{-1}(1/n3) + \sin^{-1}\{\sin(\alpha - \theta F)/n3\}$$

$$\theta h = \sin^{-1}(1/n3) - \sin^{-1}\{\sin(\alpha - \theta F - 2\cdot\beta)/n3\};$$

n3 is a refractive index of the third prism; and

θ3 is an angle formed by the line normal to the digital micromirror device and a line normal to the ON-light reflecting surface.

In one or more embodiments' optical unit having the above structure, the illumination light emitted from the first prism may be directed to the micro-mirrors through the second prism, and the ON light reflected from the micro-mirrors may pass through the second prism, the first prism, and the third prism in this order.

In one or more embodiments' optical unit having the above structure, the ON light reflected from the micro-mirrors may pass through the first prism, the second prism, and the third prism in this order, and the OFF light reflected from the micro-mirrors may be incident on the second prism through the first prism.

In one or more embodiments' optical unit having the above structure, the first prism and the second prism may be prevented from protruding from an emission surface from where the third prism emits the ON light toward the projection side.

In one or more embodiments' optical unit having the above structure, the first prism may include the illumination light reflecting surface configured to reflect the illumination light toward the micro-mirrors.

One or more embodiments' optical unit having the above structure includes a mirror member configured to reflect the illumination light toward the first prism, and the first prism may include a lens part configured to concentrate and direct toward the digital micromirror device the illumination light reflected from the mirror member.

A projector of one or more embodiments of the present invention includes a light source, the optical unit having the above structure, an illumination optical system configured to emit the illumination light toward the optical unit, and a projection optical system configured for enlarged projection of an image displayed on the digital micromirror device onto a screen.

Advantageous Effects of One or More Embodiments of the Invention

The second prism included in the optical unit of one or more embodiments of the present invention has the OFF-light reflecting surface configured to reflect the OFF light reflected from the OFF-state micro-mirrors and to transmit the ON light reflected from the ON-state micro-mirrors. Thus, in light emitted from the digital micromirror device in which the micro-mirrors are each driven biaxially, the OFF light unnecessary for the image projection can be separated spatially from the ON light necessary from the image projection in a proper manner. Consequently, the optical unit and the projector can prevent a temperature rise and stray light that might otherwise result from the OFF light.

The second prism is such that its first area is formed longer along the line normal to the projection-optical-axis plane than its second area on the other side of the projection-optical-axis plane including the optical axis of the ON light and the optical axis of the illumination light, and the first area includes the optical axis of the OFF light. The second prism can thus be reduced in thickness, whereby the optical unit and the projector can be reduced in size.

DESCRIPTION OF EMBODIMENTS

First Embodiment

Figure 1:
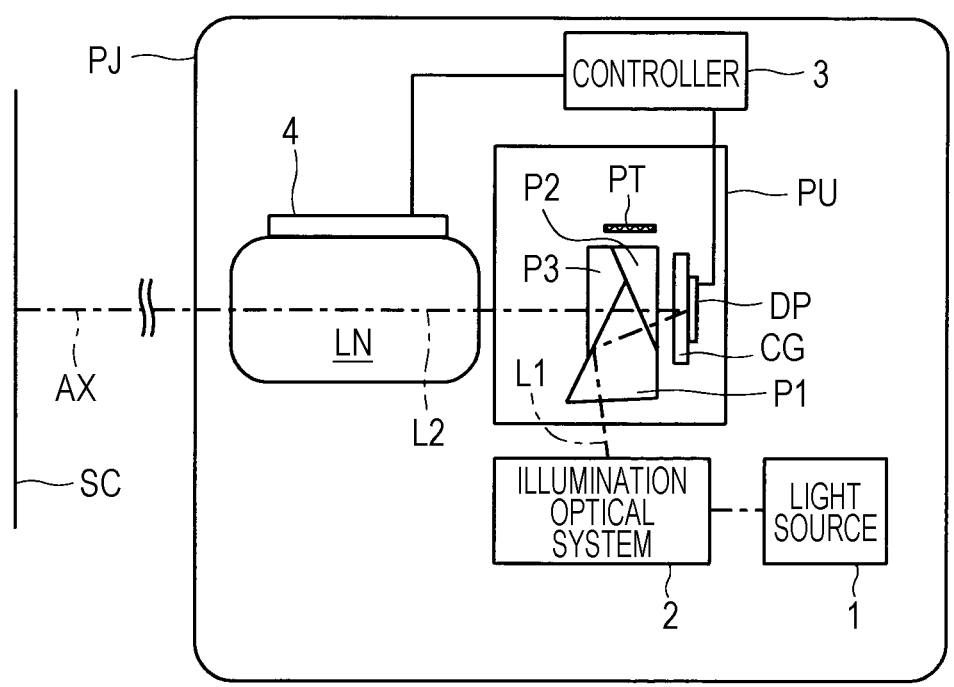
FIG. 1 is a schematic view illustrating a structure of a projector including an optical unit according to a first embodiment of the present invention.

Embodiments of the present invention are described hereinafter with reference to the accompanying drawings. FIG. 1 is a schematic view illustrating a structure of a projector including an optical unit according to the first embodiment. The projector PJ of a 1-chip type (single-plate type) includes a light source 1, an illumination optical system 2, an optical unit PU, a projection optical system LN, an actuator 4, and a controller 3.

The light source 1 is formed of, for example, an LED that emits white light. The illumination optical system 2 has a lens 71 (refer to FIGS. 3 and 4) for concentrating light from the light source 1 and emitting illumination light L1 toward the optical unit PU. The optical unit PU includes a digital micromirror device DP, a first prism P1, a second prism P2, and a third prism P3 and is supported by a support member (not illustrated) inside the projector PJ. The optical unit PU emits projection light reflected from the digital micromirror device DP (this light is described as ON light later) toward the projection optical system LN. The optical unit PU is detailed later.

The projection optical system LN has lenses 51, 52 (refer to FIG. 4) for enlarged projection of an image displayed on the digital micromirror device DP onto a screen SC. The actuator 4 moves the lenses 51, 52 for, for example, zooming, focusing and vertical shifting of a projection image. The controller 3 has a CPU for controlling the entire projector PJ.

Figure 2:
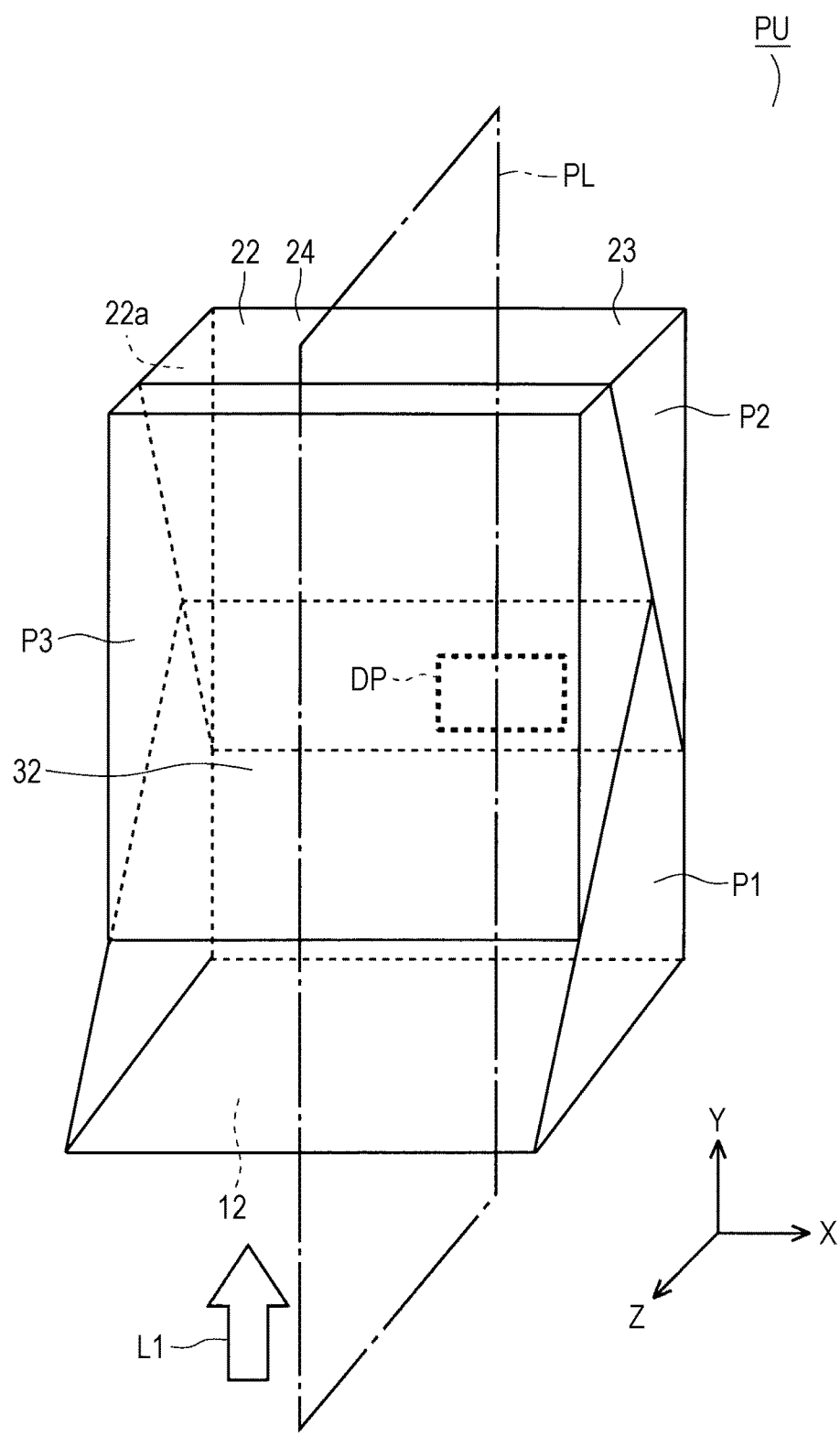
FIG. 2 is a perspective view of the optical unit according to the first embodiment of the present invention.
Figure 3:
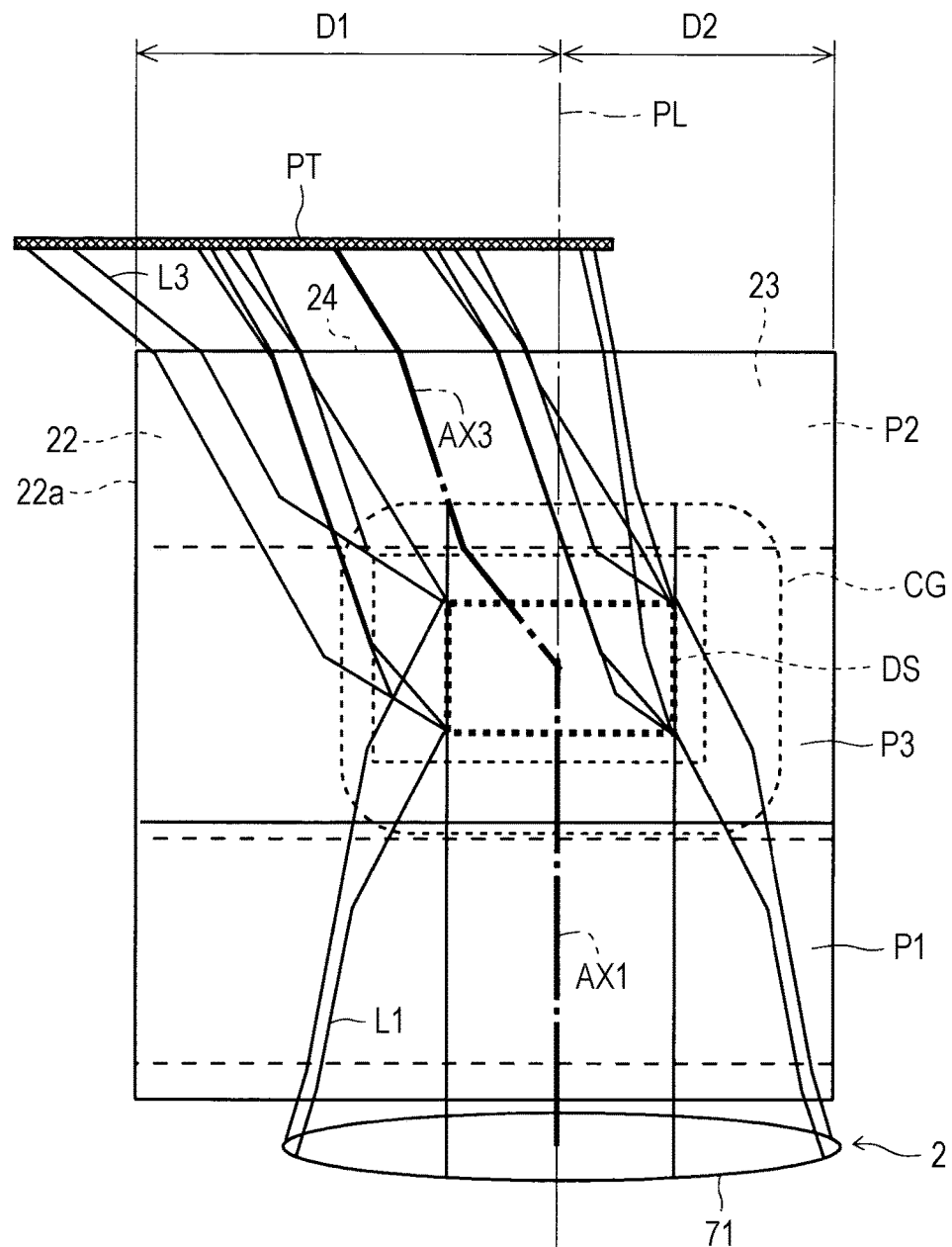
FIG. 3 is a front view of the optical unit according to the first embodiment of the present invention.
Figure 4:
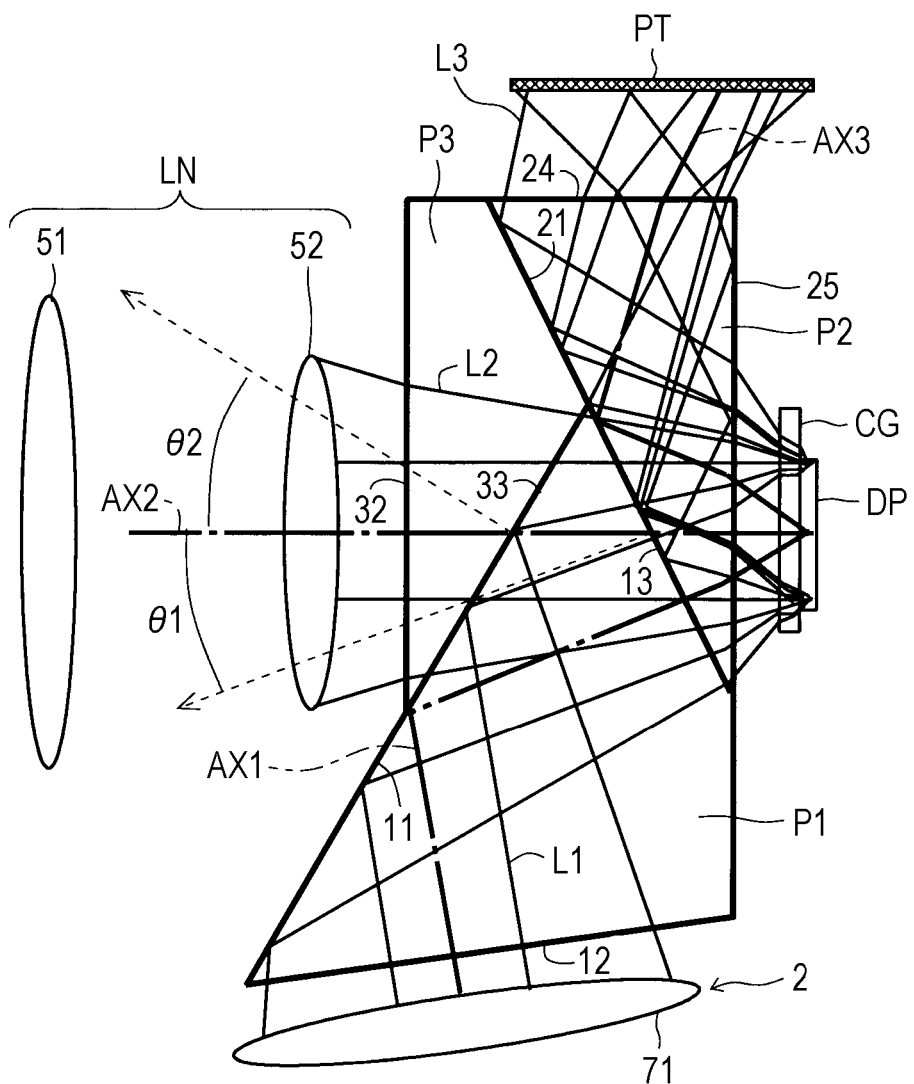
FIG. 4 is a side view of the optical unit according to the first embodiment of the present invention.

FIGS. 2 to 4 are a perspective, a front and a side view of the optical unit PU. In FIGS. 2 to 4, an X direction extends thicknesswise of the first through third prisms P1 to P3. A Z direction extends along an optical axis of the projection light (described as the ON light later) reflected from the digital micromirror device DP. A Y direction is perpendicular to the X and Z directions.

The first prism P1, the second prism P2, and the third prism P3 are each formed of a total internal reflection prism (TIR prism), and material that can be used for such a prism is, for example, glass. In the present embodiment, the first through third prisms P1 to P3 are formed of glass to have the same refractive index. The support member holds the optical unit PU by being disposed in contact with both sides (both end faces thicknesswise of the first through third prisms) of the optical unit PU.

The second prism P2 and the first prism P1 are disposed between the digital micromirror device DP and the third prism P3. The second prism P2 is disposed between the digital micromirror device DP and the first prism P1, while the first prism P1 is disposed between the second prism P2 and the third prism P3. An air gap layer (not illustrated) is provided between the first prism P1 and the second prism P2, between the second prism P2 and the third prism P3, and between the first prism P1 and the third prism P3.

For front projection, the digital micromirror device DP is disposed to overlap the first through third prisms P1 to P3 and is disposed to one side (a right side in FIG. 3) of center along the thickness of the second prism P2 (along the X direction). Moreover, a cover glass CG is provided between the digital micromirror device DP and the second prism P2.

Figure 6:
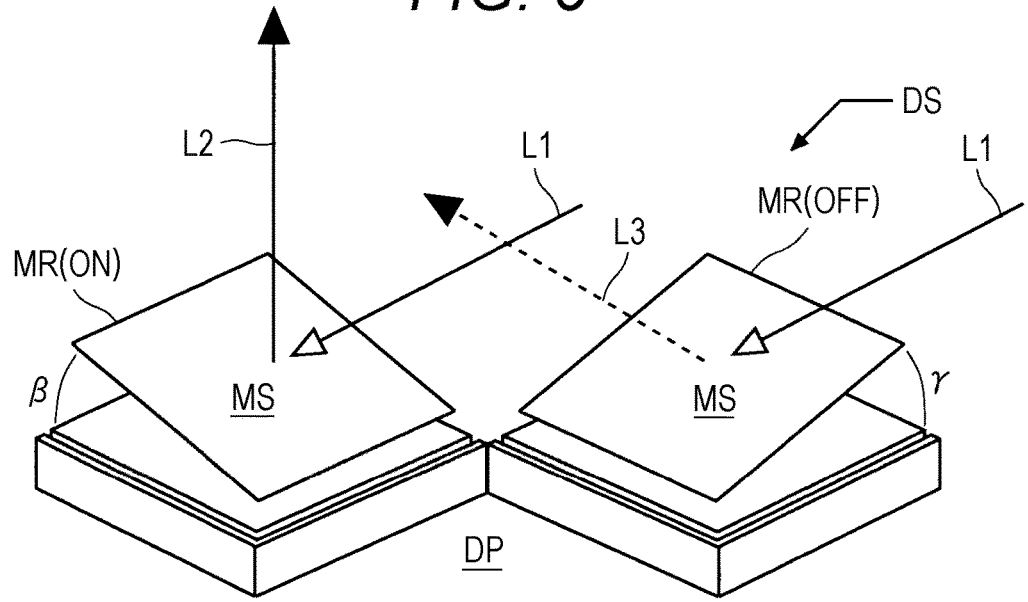
FIG. 6 is a perspective view illustrating operation of the digital micromirror device of the optical unit according to the first embodiment of the present invention.
Figure 7:
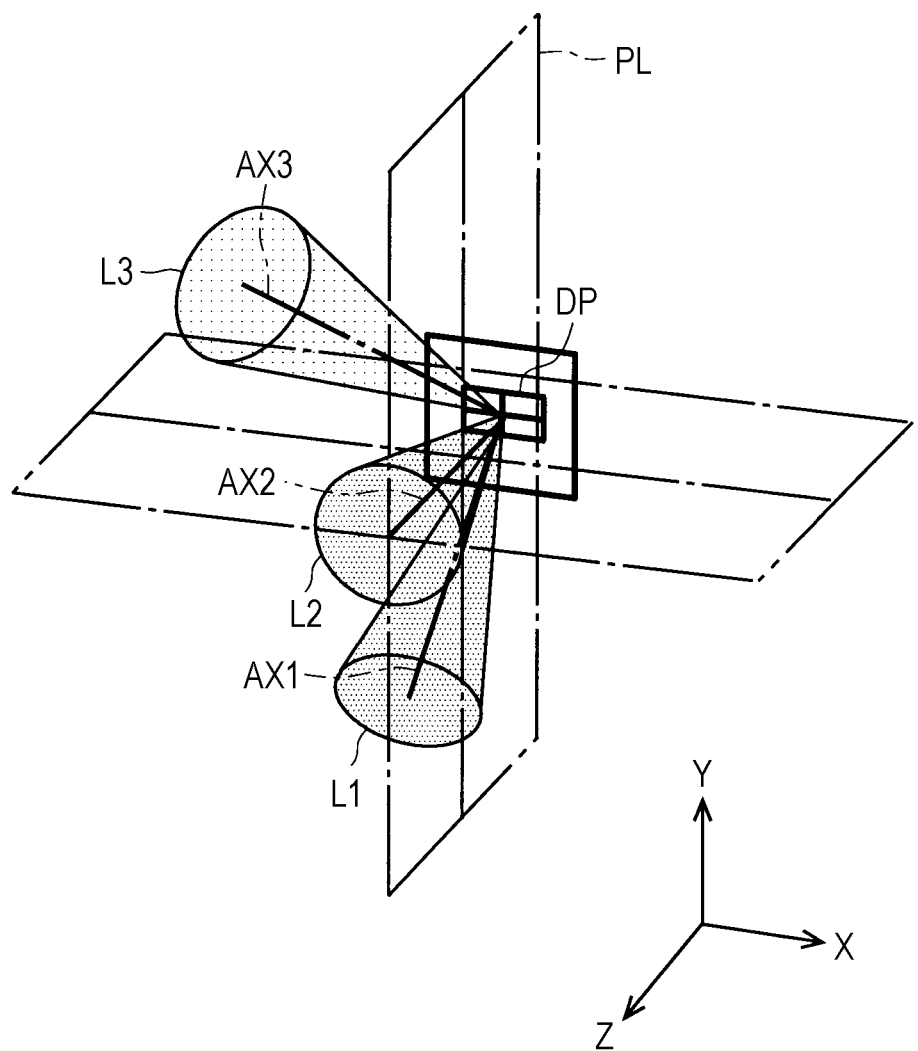
FIG. 7 is a schematic diagram illustrating illumination light on the micro-mirror of the digital micromirror device, ON light reflected from the micro-mirror in the ON state, and OFF light reflected from the micro-mirror in the OFF state in the optical unit according to the first embodiment of the present invention.

The digital micromirror device DP forms the image by intensity modulation of the illumination light L1. In the intensity modulation, a surface of each of micro-mirrors MR (refer to FIG. 6) is tilted by ON/OFF control. ON light L2 reflected from the micro-mirrors MR in an ON state is emitted from the optical unit PU to be used for image display. On the other hand, OFF light L3 reflected from the micro-mirrors MR in an OFF state is not used for the image display. As shown in FIG. 7, each of the micro-mirrors MR reflects the OFF light L3 so that an optical axis AX3 of the OFF light L3 is directed away from a projection-optical-axis plane PL including an optical axis AX2 of the ON light L2 and an optical axis AX1 of the illumination light L1. The digital micromirror device DP is detailed later.

The first prism P1 has an incident surface 12, an illumination light reflecting surface 11, and an emission surface 13. The incident surface 12 on which the illumination light L1 is incident is inclined to the Z direction and faces the lens 71. The illumination light reflecting surface 11 is inclined toward the digital micromirror device DP, heading in a direction away from the lens 71 and reflects the illumination light L1 incident from the incident surface 12. The emission surface 13 faces the second prism P2 and emits the illumination light L1 reflected from the illumination light reflecting surface 11.

The second prism P2 has an OFF-light reflecting surface 21, an emission surface 24, and an incident surface 25. The incident surface 25 on which the ON light L2 and the OFF light L3 that are reflected from the digital micromirror device DP are incident faces the cover glass CG. The OFF-light reflecting surface 21 is inclined away from the digital micromirror device DP, heading in a direction away from the lens 71, transmits the ON light L2 incident from the incident surface 25 and reflects the OFF light L3. The emission surface 24 formed of a transmission surface (polished surface) is formed opposite to the incident surface 12 across the optical axis AX2 of the ON light L2 that is reflected from the ON-state micro-mirrors MR and emits the OFF light L3 reflected from the OFF-light reflecting surface 21.

The second prism P2 has a first area 22 on one side (on a left side in FIG. 3) of the projection-optical-axis plane PL and a second area 23 on the other side (on a right side in FIG. 3) of the projection-optical axis plane PL. A length D1 of the first area 22 is longer than a length D2 of the second area 23 along a line normal to the projection-optical-axis-plane PL (along the X direction). The optical axis AX3 of the OFF light L3 is included in the first area 22.

A light absorbing member PT is provided in spaced and opposed relation to the emission surface 24 of the second prism P2. The light absorbing member PT is formed of, for example, a blackened metal plate and absorbs the OFF light L3 emitted from the emission surface 24.

The third prism P3 has an incident surface 33 and an emission surface 32. The incident surface 33 on which the ON light L2 is incident after passing through the OFF-light reflecting surface 21 of the second prism P2 is inclined toward the digital micromirror device DP, heading in a direction away from the lens 71. The emission surface 32 faces the lenses 51, 52 of the projection optical system LN and emits the ON light L2 incident from the incident surface 33. An end of the projection optical system LN side of the first prism P1 protrudes from the emission surface 32 of the third prism P3 in the direction of emission. The first prism P1 may be formed so as not to protrude from the emission surface 32 in the direction of emission.

In the projector PJ having the above structure, when the light is emitted from the light source 1, the lens 71 of the illumination optical system 2 concentrates the light and emits the illumination light L1 toward the optical unit PU. After being incident on the incident surface 12 of the first prism P1, the illumination light L1 reflects off the illumination light reflecting surface 11. The illumination light L1 reflected from the illumination light reflecting surface 11 is emitted from the emission surface 13 and is then incident on the second prism P2 via the OFF-light reflecting surface 21. The illumination light L1 incident on the second prism P2 passes through the second prism P2 and the cover glass CG in this order, thus being incident on the digital micromirror device DP. In this way, the illumination light L1 is directed to the digital micromirror device DP by the first prism P1.

Figure 5:
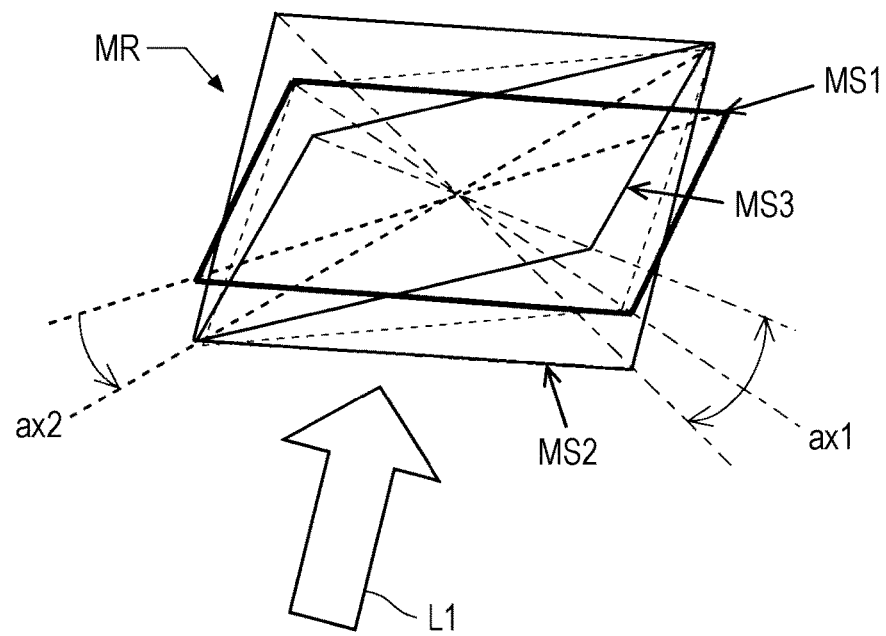
FIG. 5 is a perspective view illustrating a reference state, an ON state, and an OFF state of a micro-mirror in a digital micromirror device of the optical unit according to the first embodiment of the present invention.

FIG. 5 is a perspective view illustrating a reference state, the ON state, and the OFF state of the micro-mirror MR of the digital micromirror device DP. FIG. 6 is a perspective view illustrating operation of the digital micromirror device DP. The digital micromirror device DP includes the plurality of minute, rectangular micro-mirrors MR, and these micro-mirrors MR respectively define the pixel reflecting surfaces (micro-mirror surfaces) MS that form pixels, respectively.

In FIG. 5, the reference state of the micro-mirror MR is indicated by a reference plane MS1, the ON state of the micro-mirror MR is indicated by a reflecting surface MS2, and the OFF state of the micro-mirror MR is indicated by a reflecting surface MS3. Starting from the reference state, the micro-mirror MR can be inclined to a first axis ax1 and then rotate on a second axis ax2. In this way, in an image display plane DS formed of the plurality of pixel reflecting surfaces MS of the digital micromirror device DP, each of the pixel reflecting surfaces MS undergoes ON/OFF control in which the micro-mirror MR assumes one of two angular positions, that is, an image display state (the ON state) and an image non-display state (the OFF state). In other words, the digital micromirror device DP has each of its micro-mirrors MR driven with respect to the two orthogonal axes, whereby the micro-mirrors MR can each assume the reference state, the ON state, and the OFF state. The digital micromirror device DP thus forms a reflective image display element that performs intensity modulation of the illumination light L1 for formation of a desired image.

Because each of the micro-mirrors MR is driven with respect to the two orthogonal axes (the first axis ax1 and the second axis ax2), the pixel reflecting surface MS of the micro-mirror MR inclines in different planes. In the present embodiment, the ON state is a state in which the pixel reflecting surface MS is inclined in a YZ-plane, while the OFF state is a state in which the pixel reflecting surface MS is inclined in an XZ-plane. In normally expected ON/OFF control, when the pixel reflecting surface MS is in the ON state, the illumination light L1 incident on the micro-mirror MR is reflected in a direction along a line normal to the image display plane DS (or normal to the digital micromirror device DP), thus becoming the ON light (projection light) L2. When the pixel reflecting surface MS is in the OFF state, the illumination light L1 incident on the micro-mirror MR is reflected at a greater angle with the line normal to the image display plane DS, thus becoming the OFF light L3 (unwanted light).

As such, as shown in FIG. 7, each of the micro-mirrors MR reflects the OFF light L3 so that the optical axis AX3 of the OFF light L3 is directed away from the projection-optical-axis plane PL including the optical axis AX2 of the ON light L2 and the optical axis AX1 of the illumination light L1. Moreover, the line normal to the image display plane DS (or normal to the digital micromirror device DP) is parallel to the optical axis AX2 of the ON light (projection light) L2 near the digital micromirror device DP.

As described above, the image formed on the image display plane DS of the digital micromirror device DP by the intensity modulation of the illumination light L1 is two-dimensional. The digital micromirror device DP performs ON/OFF representation with each of the micro-mirrors MR driven with respect to the two orthogonal axes as described above.

The ON light L2 reflected from the ON-state micro-mirrors MR is incident on the second prism P2 from the incident surface 25 of the second prism P2, passes through the OFF-light reflecting surface 21 and is then incident on the first prism P1. The ON light L2 incident on the first prism P1 passes through the illumination light reflecting surface 11 and is then incident on the third prism P3 via the incident surface 33. The ON light L2 incident on the third prism P3 passes through the third prism P3 and is emitted from the emission surface 32 toward the projection optical system LN.

The ON light L2 incident on the projection optical system LN is projected onto the screen SC (refer to FIG. 1). In this way, the image displayed on the digital micromirror device DP is projected onto the screen SC in enlarged form. This is when the actuator 4 performs, for example, zooming, focusing and vertical shifting of the projection image (shifting along the Y direction).

On the other hand, the OFF light L3 reflected from the OFF-state micro-mirrors MR is incident on the second prism P2 from the incident surface 25 of the second prism P2 and then reflects off the OFF-light reflecting surface 21. The OFF light L3 reflected from the OFF-light reflecting surface 21 is emitted from the emission surface 24 to be discharged outwardly of the second prism P2. The OFF light L3 discharged from the second prism P2 is absorbed by the light absorbing member PT.

The light absorbing member PT is spaced away from the emission surface 24 of the second prism P2. In this way, heat transfer from the light absorbing member PT absorbing the OFF light L3 to the second prism P2 can be suppressed. Accordingly, a temperature rise of the second prism P2 can be suppressed, and thermal deformation or the like of the second prism P2 can be prevented. Consequently, the optical unit PU and the projector PJ can each have a longer life.

The optical axis AX3 of the OFF light L3 is included in the first area 22. Light rays along the optical axis AX3 of the OFF light L3 passing through the second prism P2 are emitted from the emission surface 24 different from an end face 22a of the first area 22 that faces the projection-optical-axis plane PL. In this way, incidence of the OFF light L3 on the end face 22a can be suppressed. Accordingly, a temperature rise that might be caused by light scattering and light absorption at the end face 22a can be suppressed. Moreover, treatment (such as polishing) of the end face 22a for causing the OFF light L3 to reflect off the end face 22a can be omitted, so that increase in cost can be suppressed.

Illumination light (flat light) L1 reflecting off the micromirror MR shifting between the ON state and the OFF state is reflected in a direction opposite to the direction of the illumination light L1 across a line normal to the micromirror MR. The flat light and even illumination light L1 reflected from the cover glass CG are incident on the second prism P2, reflect off the OFF-light reflecting surface 21, and are then emitted from the emission surface 24. In this way, the flat light and the illumination light L1 reflected from the cover glass CG are prevented from being incident on the projection optical system LN. Accordingly, the projection image can be prevented from having lower contrast.

In one or more embodiments of the present embodiment, a color wheel (not illustrated) may be provided between the illumination optical system 2 and the light source 1. The color wheel has an annular frame in which a red, a blue and a green filter are circumferentially arranged in order. With the illumination light L1 allowed to pass through the filters during circumferential rotation of the color wheel, a color image can be projected.

Here, when an angle θ1 formed by the line normal to the digital micromirror device DP and a line normal to the OFF-light reflecting surface 21 satisfies the following conditional expression (1), the OFF-light reflecting surface 21 can transmit the ON light L2 and totally reflect nearly all the OFF light L3.

$$\theta a \geq \theta 1 \geq \theta b \quad (1)$$

where:

$$\theta a = \sin^{-1}(1/n) - \sin^{-1}\{\sin(\alpha + \theta F - 2\cdot\beta)/n\};$$

$$\theta b = \sin^{-1}\sqrt{[\{n^2 - 1 + \cos^2(\alpha - \theta F)\cdot\cos^2(2\cdot\gamma)\}/\{n^2 - \cos^2(\alpha - \theta F)\cdot\sin^2(2\cdot\gamma)\}] - \sin^{-1}\sqrt{[(n^2 - 1)/\{n^2 - \cos^2(\alpha - \theta F)\cdot\sin^2(2\cdot\gamma)\}]}};$$

$$\theta F = \sin^{-1}(1/2\cdot F);$$

α is an angle formed by the optical axis of the light incident on the digital micromirror device DP and the line normal to the digital micromirror device DP;

β is an angle formed by a line normal to each of the ON-state micro-mirrors MR and the line normal to the digital micromirror device DP;

γ is an angle formed by a line normal to each of the OFF-state micro-mirrors MR and the line normal to the digital micromirror device DP;

n is the refractive index of the second prism P2; and

F is an F-number.

Figure 8:
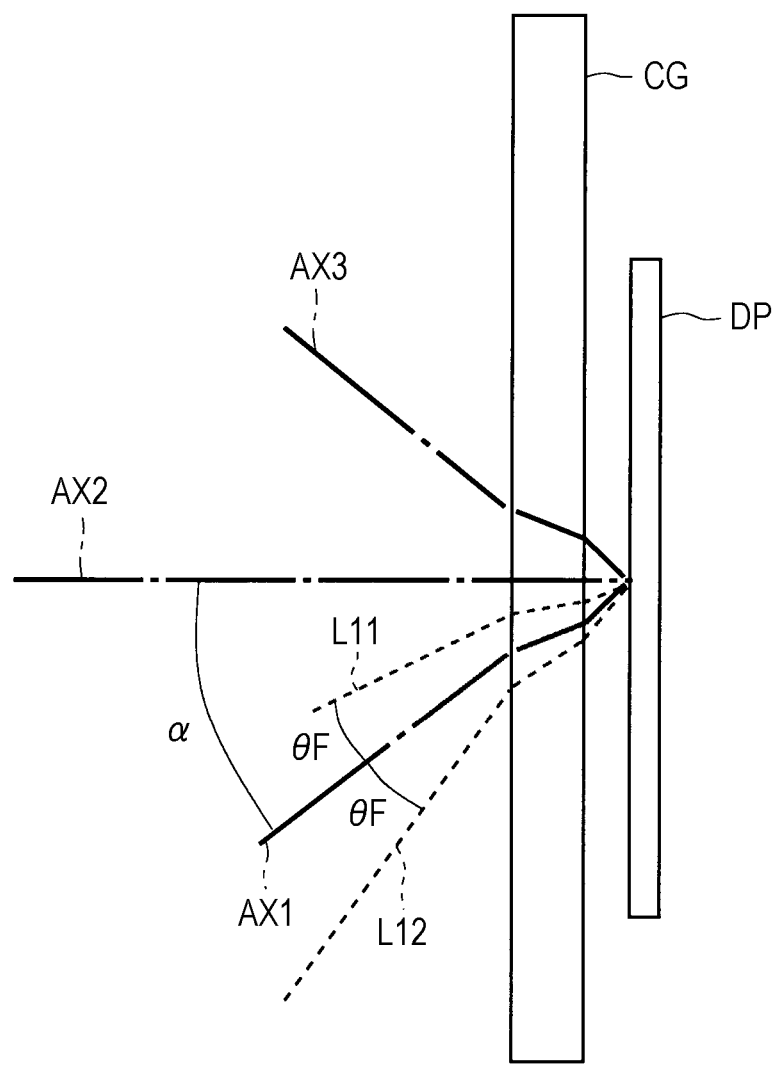
FIG. 8 is an enlarged side view of a periphery of the digital micromirror device in the optical unit according to the first embodiment of the present invention.

As shown in FIG. 8, the illumination light L1 having the optical axis AX1 in the projection-optical-axis plane PL has a spread angle θF based on the F-number. An angle θa represents a critical angle at which the farthest light ray (lower ray) L12 of the illumination light L1 from the optical axis AX2 of the ON light L2 is incident as ON light on the OFF-light reflecting surface 21. An angle θb represents a critical angle at which the closest light ray (upper ray) L11 of the illumination light L1 to the optical axis AX2 of the ON light L2 is incident as OFF light on the OFF-light reflecting surface 21.

When, for example, α=34°, β=17°, γ=17°, and n=1.51872 with the F-number being F/1.80, 30.64°≥θ1≥24.07°. Here, the OFF-light reflecting surface 21 can transmit the ON light L2 and totally reflect nearly all the OFF light L3.

When the OFF-light reflecting surface 21 is formed with the angle θ1 set to a lower limit of 24.07°, the optical unit PU can be reduced in length along the optical axis AX2 (Z direction) of the ON light (projection light) L2. Accordingly, a back focal length (a distance between a frontmost surface of the lens 51 and the image display plane DS) of the projection optical system LN can be reduced. Consequently, the optical unit PU and the projector PJ can be reduced in size.

For total reflection of all the OFF light L3 with the F-number being F/1.80, the angle θ1 needs to be not less than 25.340. However, it is only unidirectional OFF light L3 incident on the OFF-light reflecting surface 21 at a shallow angle with the F-number ranging from F/1.80 to F/2.04 that the OFF-light reflecting surface 21 cannot totally reflect. For this reason, when the above conditional expression (1) is satisfied, the majority of the OFF light L3 can be reflected off the OFF-light reflecting surface 21, thus being prevented from being emitted toward a projection side. Accordingly, the projection image can be prevented from having lower contrast.

With the F-number being F/2.04, the OFF light L3 can 100% undergo total reflection at the OFF-light reflecting surface 21.

When an angle θ2 formed by the line normal to the digital micromirror device DP and a line normal to the illumination light reflecting surface 11 satisfies the following conditional expression (2), the illumination light reflecting surface 11 can transmit the ON light L2 and totally reflect nearly all the illumination light L1.

$$\theta c \geq \theta 2 \geq \theta d \quad (2)$$

where:

$$\theta c = \sin^{-1}(1/n1) + \sin^{-1}\{\sin(\alpha - \theta F - 2\cdot\beta)/n1\};$$

$$\theta d = \sin^{-1}(1/n1) - \sin^{-1}\{\sin(\alpha - \theta F)/n1\}; \theta F = \sin^{-1}(1/2\cdot F);$$

α is the angle formed by the optical axis of the light incident on the digital micromirror device DP and the line normal to the digital micromirror device DP;

β is the angle formed by the line normal to each of the ON-state micro-mirrors MR and the line normal to the digital micromirror device DP;

n1 is the refractive index of the first prism P1; and

F is the F-number.

An angle θc represents a critical angle at which the light ray L11 (refer to FIG. 8) is incident as ON light on the illumination light reflecting surface 11. An angle θd represents a critical angle at which the light ray L11 (refer to FIG. 8) incident from the incident surface 12 is incident as illumination light on the illumination light reflecting surface 11.

When, for example, α=34°, β=17°, γ=17°, and n1=1.51872 with the F-number being F/1.80, 30.64°≥θ2≥29.52°. Here, the illumination light reflecting surface 11 can transmit the ON light L2 and totally reflect nearly all the illumination light L1.

When the illumination light reflecting surface 11 is formed with the angle θ2 set to a lower limit of 29.52°, the optical unit PU can be reduced in length along the optical axis AX2 (Z direction) of the ON light (projection light) L2. Accordingly, the back focal length (distance between the frontmost surface of the lens 51 and the image display plane DS) of the projection optical system LN can be reduced. Consequently, the optical unit PU and the projector PJ can be reduced in size.

According to the present embodiment, the second prism P2 included has the OFF-light reflecting surface 21 that reflects the OFF light L3 reflected from the OFF-state micro-mirrors MR and transmits the ON light L2 reflected from the ON-state micro-mirrors MR. In light reflected from the digital micromirror device DP in which the micro-mirrors MR are each driven biaxially, the OFF light L3 unnecessary for image projection can thus be separated spatially from the ON light L2 necessary for the image projection in a proper manner, whereby ghost light that might otherwise result from incidence of the OFF light L3 on the projection optical system LN can be prevented. Moreover, a local temperature rise in the projection optical system LN that might otherwise result from the incidence of the OFF light L3 on the projection optical system LN can be prevented. Consequently, a decline in imaging performance of the projection optical system LN can be prevented, and the projection image can be prevented from having lower contrast.

The second prism P2 is such that its first area 22 is formed longer along the line normal to the projection-optical-axis plane PL (thicknesswise) than its second area 23 on the other side of the projection-optical-axis plane PL, and the optical axis AX3 of the OFF light L3 is included in the first area 22. The second prism P2 can thus be reduced in thickness, whereby the optical unit PU and the projector PJ can be reduced in size.

The light rays along the optical axis AX3 of the OFF light L3 passing through the second prism P2 are emitted from the emission surface 24, being an end face different from the end face 22a of the second prism P2 that faces the projection-optical-axis plane PL. In this way, the incidence of the OFF light L3 on the end face 22a can be suppressed. Accordingly, a temperature rise that might be caused by light scattering and light absorption at the end face 22a can be suppressed.

With the conditional expression (1) satisfied, the OFF-light reflecting surface 21 can transmit the ON light L2 and totally reflect nearly all the OFF light L3.

With the conditional expression (2) satisfied, the illumination light reflecting surface 11 can transmit the ON light L2 and totally reflect nearly all the illumination light L1.

The illumination light L1 emitted from the first prism P1 is directed to the micro-mirrors MR through the second prism P2, and the ON light L2 reflected from the micro-mirrors MR passes through the second prism P2, the first prism P1, and the third prism P3 in this order. The OFF light L3 is thus prevented from being incident on the projection optical system LN, and the back focal length of the projection optical system LN can be reduced.

The projector PJ includes the illumination optical system 2 that emits the illumination light L1 toward the optical unit PU, and the projection optical system LN configured for the enlarged projection of the image displayed on the digital micromirror device DP onto the screen SC. The projector PJ can thus be reduced in size and project a high-contrast image.

Second Embodiment

Figure 9:
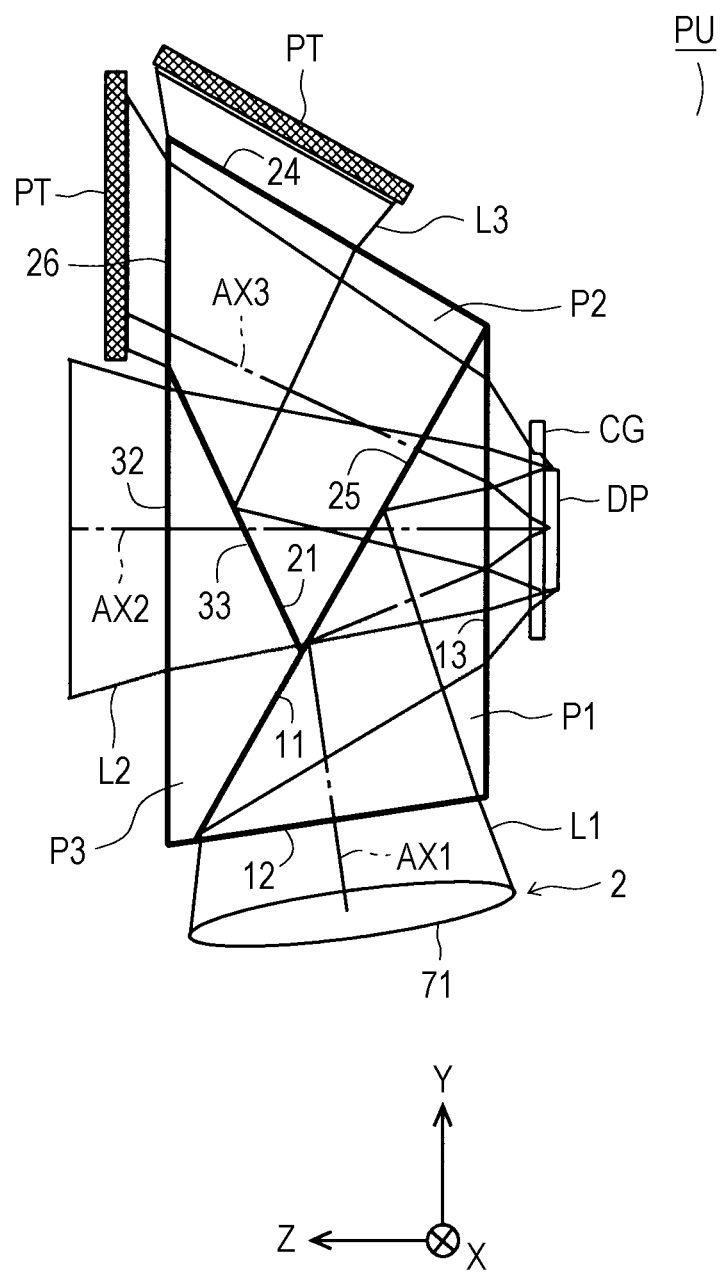
FIG. 9 is a side view of an optical unit according to a second embodiment of the present invention.

A description is provided next of the second embodiment of the present invention. FIG. 9 is a side view of an optical unit according to the second embodiment. For convenience of explanation, parts similar to those in the first embodiment illustrated by FIGS. 1 to 8 have the same reference signs. In the present embodiment, a first through a third prism P1 to P3 are arranged differently from those of the first embodiment. The present embodiment is otherwise similar to the first embodiment.

The first prism P1 and the second prism P2 are disposed between a digital micromirror device DP and the third prism P3. The second prism P2 is disposed between the first prism P1 and the third prism P3. The first prism P1 is disposed between the digital micromirror device DP and the second prism P2.

An emission surface 13 of the first prism P1 faces a cover glass CG. An incident surface 25 of the second prism P2 is inclined toward the digital micromirror device DP, heading in a direction away from a lens 71. An OFF-light reflecting surface 21 is inclined away from the digital micromirror device DP, heading in a direction away from the lens 71. The second prism P2 is formed with, at its front, an emission surface 26 that emits OFF light L3. A light absorbing member PT is provided in spaced and opposed relation to the emission surface 26. An incident surface 33 is inclined away from the digital micromirror device DP, heading in a direction away from the lens 71.

The first prism P1 and the second prism P2 do not protrude from an emission surface 32 of the third prism P3 toward an image projection side. In this way, even with a shorter distance between the optical unit PU and a lens 51, the lens 51 and a lens 52 of a projection optical system LN can be prevented from interfering with the optical unit PU when moving along a Z direction. Thus, a projection image can be enlarged and scaled down with ease. Moreover, the lenses 51, 52 of the projection optical system LN can be prevented from interfering with the optical unit PU when moving along a Y direction. Thus, the projection optical system LN can shift the projection image vertically (along the Y direction) with ease. Furthermore, another member (such as using Smooth Picture) can be disposed between the emission surface 32 and the lens 51 with a back focal length of the projection optical system LN not increased.

In the optical unit PU of the present embodiment, illumination light L1 incident on the first prism P1 from an incident surface 12 reflects off an illumination light reflecting surface 11 and is emitted from the emission surface 13 toward the digital micromirror device DP. ON light L2 reflected from ON-state micro-mirrors MR passes through the illumination light reflecting surface 11 of the first prism P1 and is then incident on the second prism P2 from the incident surface 25. The ON light L2 incident on the second prism P2 passes through the OFF-light reflecting surface 21 to be incident on the third prism P3 from the incident surface 33. The ON light L2 incident on the third prism P3 is emitted from the emission surface 32 toward the projection optical system LN. In this way, the ON light L2 reflected from the ON-state micro-mirrors MR passes through the first prism P1, the second prism P2, and the third prism P3 in this order.

On the other hand, the OFF light L3 reflected from OFF-state micro-mirrors MR passes through the illumination light reflecting surface 11 of the first prism P1 and is incident on the second prism P2. The OFF light L3 incident on the second prism P2 reflects off the OFF-light reflecting surface 21 and is emitted outwardly of the second prism P2 from an emission surface 24. This is when some of the OFF light L3 is emitted from the emission surface 26 without reflecting off the OFF-light reflecting surface 21, thus being absorbed by the light absorbing member PT facing the emission surface 26.

Even in the present embodiment, effects similar to those in the first embodiment can be obtained. The first prism P1 and the second prism P2 do not protrude from the emission surface 32 of the third prism P3 toward the image projection side. The lenses 51, 52 of the projection optical system LN can thus be prevented from interfering with the optical unit PU when moving along the Y direction. Consequently, the projection optical system LN can shift the projection image vertically with ease.

Third Embodiment

Figure 10:
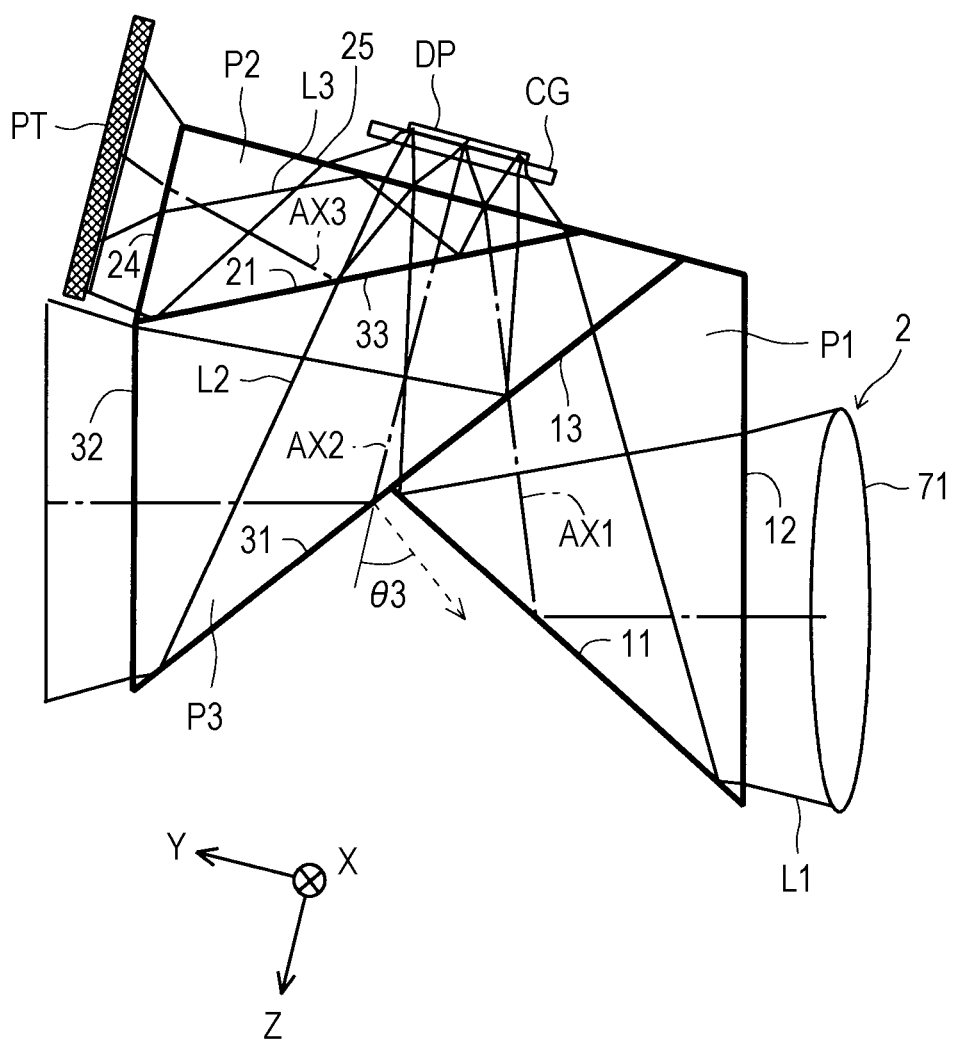
FIG. 10 is a side view of an optical unit according to a third embodiment of the present invention.

A description is provided next of the third embodiment of the present invention. FIG. 10 is a side view of an optical unit according to the third embodiment. For convenience of explanation, parts similar to those in the first embodiment illustrated by FIGS. 1 to 8 have the same reference signs. In the present embodiment, a first through a third prism P1 to P3 are arranged differently from those of the first embodiment. The present embodiment also differs from the first embodiment in that the third prism P3 is provided with an ON-light reflecting surface 31. The present embodiment is otherwise similar to the first embodiment.

The second prism P2 and the third prism P3 are disposed between a digital micromirror device DP and the first prism P1. The third prism P3 is disposed between the first prism P1 and the second prism P2. The second prism P2 is disposed between the digital micromirror device DP and the third prism P3. The first prism P1 and the third prism P3 are disposed so that an incident surface 12 of the first prism P1 and an emission surface 32 of the third prism P3 are in a substantially parallel relationship.

An emission surface 13 of the first prism P1 is inclined toward a projection optical system LN (refer to FIG. 4), heading in a direction away from a lens 71. An illumination light reflecting surface 11 is inclined toward the digital micromirror device DP, heading in a direction away from the lens 71. The illumination light reflecting surface 11 is formed by vapor deposition of metal such as aluminum or silver. The illumination light reflecting surface 11 may alternatively be formed of a dielectric multilayer.

An incident surface 25 of the second prism P2 faces a cover glass CG. An OFF-light reflecting surface 21 is inclined away from the digital micromirror device DP, heading in a direction away from the lens 71. The second prism P2 is formed with an emission surface 24 at its front.

An incident surface 33 of the third prism P3 is inclined away from the digital micromirror device DP, heading in a direction away from the lens 71. The third prism P3 has the ON-light reflecting surface 31 that is inclined toward the projection optical system LN, heading in a direction away from the digital micromirror device DP. The ON-light reflecting surface 31 transmits illumination light L1 and reflects ON light L2 toward the emission surface 32.

In the optical unit PU of the present embodiment, the illumination light L1 incident on the first prism P1 from the incident surface 12 reflects off the illumination light reflecting surface 11 and is then incident on the third prism P3 from the emission surface 13. After passing through the third prism P3, the illumination light L1 passes through the second prism P2 via the OFF-light reflecting surface 21. After passing through the second prism P2, the illumination light L1 is incident on the digital micromirror device DP. In other words, the illumination light L1 passes through the first prism P1, the third prism P3, and the second prism P2 in this order.

The ON light L2 reflected from ON-state micro-mirrors MR is incident on the second prism P2 from the incident surface 25, passes through the OFF-light reflecting surface 21, and is incident on the third prism P3. The ON light L2 incident on the third prism P3 reflects off the ON-light reflecting surface 31 and is then emitted from the emission surface 32 toward the projection optical system LN. Here, an optical axis of the light incident on the illumination light reflecting surface 11 and an optical axis of the light reflected from the ON-light reflecting surface 31 are substantially parallel to each other.

On the other hand, OFF light L3 reflected from OFF-state micro-mirrors MR is incident on the second prism P2 from the incident surface 25. The OFF light L3 incident on the second prism P2 reflects off the OFF-light reflecting surface 21 and is then emitted from the emission surface 24 to be discharged outwardly of the second prism P2.

Here, when an angle θ3 formed by a line normal to the digital micromirror device DP and a line normal to the ON-light reflecting surface 31 satisfies the following conditional expression (3), the ON-light reflecting surface 31 can transmit the illumination light L1 and totally reflect nearly all the ON light L2.

$$\theta e \geq \theta 3 \geq \theta h \qquad (3)$$

where:

$$\theta e = \sin^{-1}(1/n3) + \sin^{-1}\{\sin(\alpha - \theta F)/n3\};$$

$$\theta h = \sin^{-1}(1/n3) - \sin^{-1}\{\sin(\alpha - \theta F - 2\cdot\beta)/n3\};$$

$$\theta F = \sin^{-1}(1/2\cdot F);$$

α is an angle formed by an optical axis of the light incident on the digital micromirror device DP and the line normal to the digital micromirror device DP;

β is an angle formed by a line normal to each of the ON-state micro-mirrors MR and the line normal to the digital micromirror device DP;

n3 is a refractive index of the third prism P3; and

F is an F-number.

An angle θe represents a critical angle at which a light ray L11 (refer to FIG. 8) is incident as illumination light on the ON-light reflecting surface 31. An angle θh represents a critical angle at which the light ray L11 is incident as ON light on the ON-light reflecting surface 31.

When, for example, α=34°, β=17°, γ=17°, and n3=1.51872 with the F-number being F/1.80, 52.84°≥θ3≥51.72°. Here, the ON-light reflecting surface 31 can transmit the illumination light L1 and totally reflect nearly all the ON light L2.

Even in the present embodiment, effects similar to those in the first embodiment can be obtained. The first prism P1 has the illumination light reflecting surface 11 that reflects the illumination light L1 toward the micro-mirrors MR. The illumination light L1 then passes through the third prism P3 and the second prism P2 in this order to be directed to the micro-mirrors MR, and the ON light L2 reflected from the micro-mirrors MR is incident on the third prism P3 through the second prism P2 and reflects off the ON-light reflecting surface 31 to be emitted toward a projection side. In this way, the optical unit PU can be reduced in length along its Z direction, whereby a projector PJ can be of lower profile.

With the conditional expression (3) satisfied, the ON-light reflecting surface 31 can transmit the illumination light L1 and totally reflect nearly all the ON light L2.

Fourth Embodiment

Figure 11:
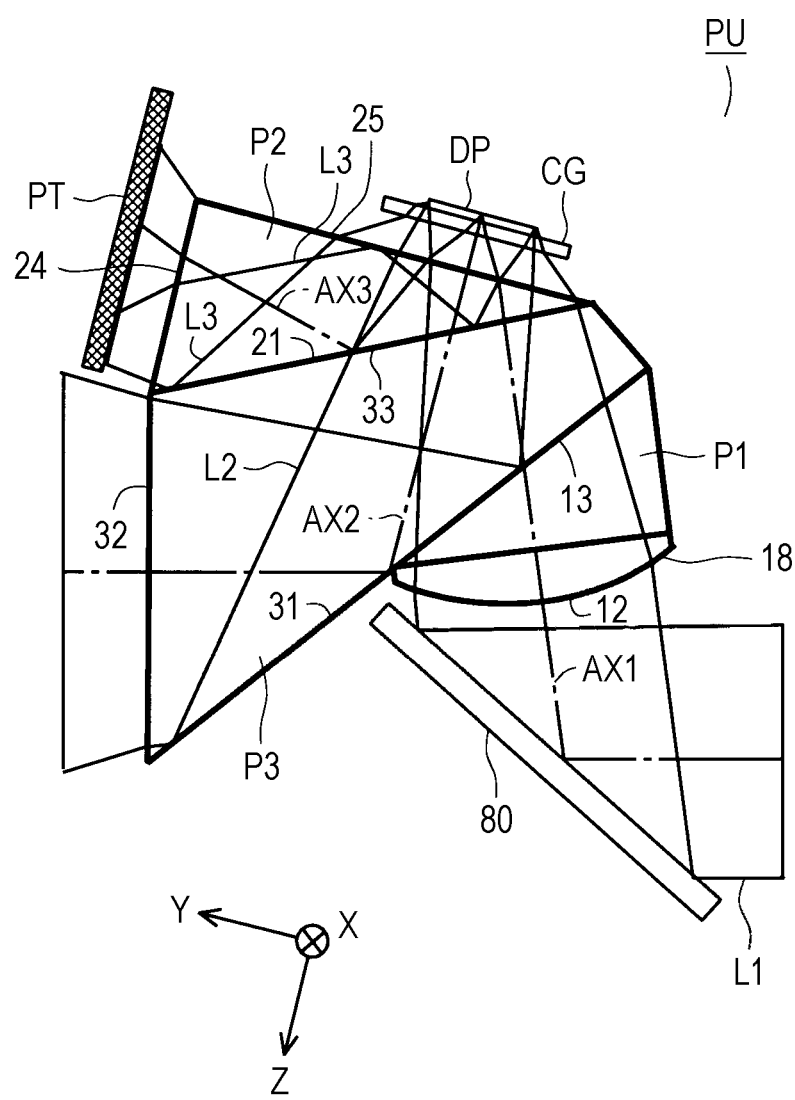
FIG. 11 is a side view of an optical unit according to a fourth embodiment of the present invention.

A description is provided next of the fourth embodiment of the present invention. FIG. 11 is a side view of an optical unit according to the fourth embodiment. For convenience of explanation, parts similar to those in the first embodiment illustrated by FIGS. 1 to 8 and those in the third embodiment illustrated by FIG. 10 have the same reference signs. In the present embodiment, a first through a third prism P1 to P3 are arranged differently from those of the first embodiment. Moreover, the first prism P1 of the present embodiment structurally differs from that of the third embodiment. The present embodiment is otherwise similar to the first and third embodiments.

In the present embodiment, an illumination light reflecting surface 11 is excluded from the first prism P1. The optical unit PU is provided with a mirror member 80 that reflects illumination light L1 toward the first prism P1. The first prism P1 is provided with a lens part 18 facing the mirror member 80. The lens part 18 concentrates and directs toward a digital micromirror device DP the illumination light L1 reflected from the mirror member 80. The lens part 18 is formed with an incident surface 12. The mirror member 80 and the third prism P3 are disposed so that an optical axis of the light incident on the mirror member 80 and an optical axis of light reflected from an ON-light reflecting surface 31 are substantially parallel to each other.

Even in the present embodiment, effects similar to those in the first and third embodiments can be obtained. The mirror member 80 included reflects the illumination light L1 toward the first prism P1, and the first prism P1 has the lens part 18 that concentrates and directs toward the digital micromirror device DP the illumination light L1 reflected from the mirror member 80. In this way, the illumination light L1 can be directed to the digital micromirror device DP with efficiency.

Fifth Embodiment

Figure 12:
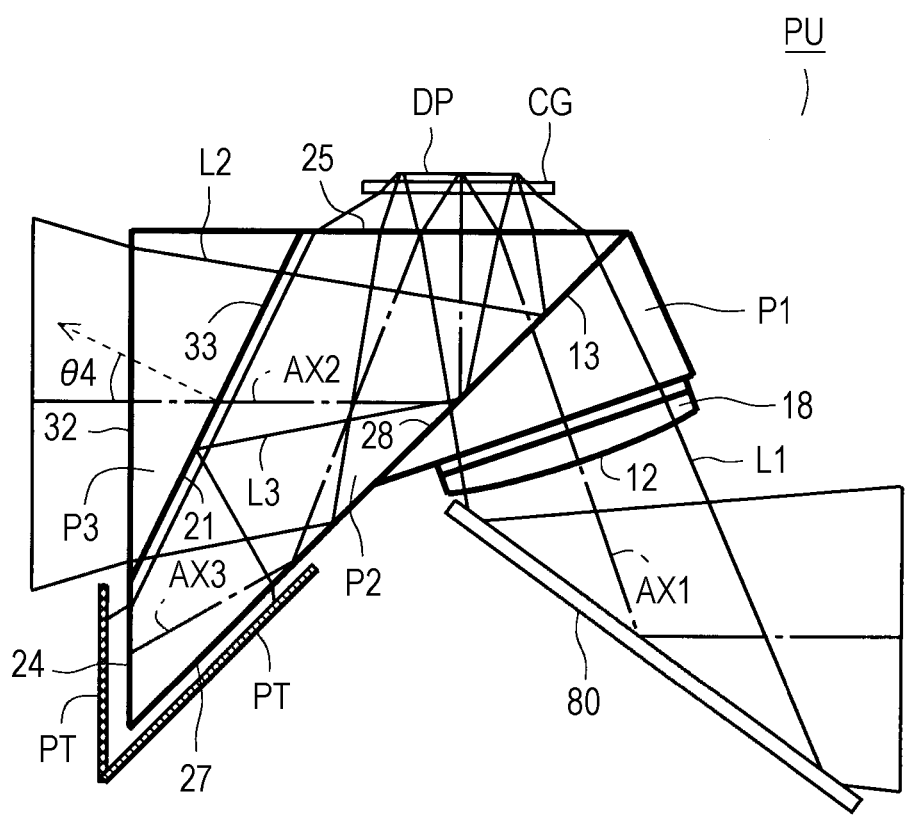
FIG. 12 is a side view of an optical unit according to a fifth embodiment of the present invention.

A description is provided next of the fifth embodiment of the present invention. FIG. 12 is a side view of an optical unit according to the fifth embodiment. For convenience of explanation, parts similar to those in the first embodiment illustrated by FIGS. 1 to 8 and those in the fourth embodiment illustrated by FIG. 11 have the same reference signs. In the present embodiment, a first through a third prism P1 to P3 are arranged differently from those of the first embodiment. Moreover, the second prism P2 and the third prism P3 are disposed differently from those of the fourth embodiment. The present embodiment is otherwise similar to the first and fourth embodiments.

The second prism P2 is disposed between a digital micromirror device DP and the first prism P1. The second prism P2 disposed is sandwiched between the first prism P1 and the third prism P3 along a Y direction. The first prism P1 and the third prism P3 fall within a Z-direction width of the second prism P2.

An incident surface 25 of the second prism P2 faces a cover glass CG. An OFF-light reflecting surface 21 is inclined toward a projection optical system LN (refer to FIG. 4), heading in a direction away from the digital micromirror device DP. The second prism P2 is formed with an emission surface 24 at its front and is also formed with, at its rear, an emission surface 27 that emits OFF light L3. A light absorbing member PT is provided in spaced and opposed relation to the emission surface 27. An end face of the second prism P2 is formed with a reflecting surface 28 at its end close to an emission surface 13. The reflecting surface 28 is inclined toward the projection optical system LN, heading in a direction away from the digital micromirror device DP.

An incident surface 33 of the third prism P3 is inclined toward the projection optical system LN, heading in a direction away from the digital micromirror device DP.

Here, when an angle θ4 formed by a line normal to the OFF-light reflecting surface 21 and an optical axis AX2 of ON light L2 near the OFF-light reflecting surface 21 satisfies the conditional expression (1) by replacing θ1 in the conditional expression (1), the OFF-light reflecting surface 21 can transmit the ON light L2 and totally reflect nearly all the OFF light L3.

In the optical unit PU of the present embodiment, illumination light L1 that is incident on the first prism P1 from an incident surface 12 after reflecting off a mirror member 80 is incident on the second prism P2 from the emission surface 13. After passing through the second prism P2, the illumination light L1 is incident on the digital micromirror device DP.

The ON light L2 reflected from ON-state micro-mirrors MR is incident on the second prism P2 from the incident surface 25, reflects off the reflecting surface 28, and then passes through the OFF-light reflecting surface 21, thus being incident on the third prism P3. The ON light L2 incident on the third prism P3 is emitted from an emission surface 32 toward the projection optical system LN. Here, an optical axis of the light incident on the mirror member 80 and the optical axis of the ON light L2 reflected from the reflecting surface 28 are substantially parallel to each other.

The OFF light L3 reflected from OFF-state micro-mirrors MR is incident on the second prism P2 from the incident surface 25. Some of the OFF light L3 incident on the second prism P2 reflects off the reflecting surface 28 and then the OFF-light reflecting surface 21 and is thereafter emitted from the emission surface 27 to be discharged outwardly of the second prism P2. Some of the OFF light L3 incident on the second prism P2 is emitted from the emission surface 24 without being incident on the OFF-light reflecting surface 21.

Even in the present embodiment, effects similar to those in the first and fourth embodiments can be obtained. The first prism P1 and the third prism P3 fall within the Z-direction width of the second prism P2. In this way, the optical unit PU can be made more compact.

In the third through fifth embodiments, the first prism P1 may have a refractive index that differs from respective refractive indices of the second prism P2 and the third prism P3. Even in this case, imaging performance of the lenses 51, 52 of the projection optical system LN is not degraded, so that there is no great hindrance.

INDUSTRIAL APPLICABILITY

One or more embodiments of the present invention can be used for an optical unit having a digital micromirror device in which micro-mirrors are each driven biaxially and also for a projector including the same.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

PJ projector
LN projection optical system

PU optical unit
PT light absorbing member
DP digital micromirror device
DS image display plane
MR micro-mirror
MS pixel reflecting surface
CG cover glass
P1 first prism
P2 second prism
P3 third prism
L1 illumination light
L2 ON light (projection light)
L3 OFF light (unwanted light)
AX1 optical axis of illumination light
AX2 optical axis of projection light (ON light)
AX3 optical axis of OFF light
MS1 reference plane
MS2 ON reflecting surface
MS3 OFF reflecting surface
PL projection-optical-axis plane
1 light source
2 illumination optical system
3 controller
4 actuator
11 illumination light reflecting surface
18 lens part
21 OFF-light reflecting surface
31 ON-light reflecting surface
51, 52, 71 lens
80 mirror member
AX optical axis
SC screen

The invention claimed is:

1. An optical unit comprising:
a digital micromirror device that forms an image by such illumination light intensity modulation that in an image display plane formed of a plurality of micro-mirrors, a surface of each of the micro-mirrors is tilted by ON/OFF control, each of the micro-mirrors being driven biaxially in the ON/OFF control; and
a second prism including an OFF-light reflecting surface that reflects OFF light reflected from the micro-mirrors in an OFF state and transmits ON light reflected from the micro-mirrors in an ON state,
wherein the micro-mirrors reflect the OFF light so that an optical axis of the OFF light is directed away from a projection-optical-axis plane including an optical axis of the ON light and an optical axis of the illumination light,
the second prism's first area on one side of the projection-optical-axis plane is formed longer along a line normal to the projection-optical-axis plane than the second prism's second area on another side of the projection-optical-axis plane, and
the first area includes the optical axis of the OFF light.

2. The optical unit according to claim 1, wherein a light ray along the optical axis of the OFF light passing through the second prism is emitted from an end face of the second prism that is different from the second prism's end face facing the projection-optical-axis plane.

3. The optical unit according to claim 1, further comprising:
a first prism that directs illumination light to the digital micromirror device; and
a third prism that emits the ON light incident from the second prism toward a projection side.

4. The optical unit according to claim 3, wherein a light ray along the optical axis of the OFF light passing through the second prism is emitted from an end face of the second prism that is different from the second prism's end face facing the projection-optical-axis plane.

5. The optical unit according to claim 3, wherein the following conditional expression (1) is satisfied:

$$\theta a \geq \theta 1 \geq \theta b \qquad (1)$$

where:

$\theta a = \sin^{-1}(1/n) - \sin^{-1}\{\sin(\alpha + \theta F - 2\cdot\beta)/n\}$;

$\theta b = \sin^{-1}\sqrt{[\{n^2-1+\cos^2(\alpha-\theta F)\cdot\cos^2(2\cdot\gamma)\}/\{n^2-\cos^2(\alpha-\theta F)\cdot\sin^2(2\cdot\gamma)\}] - \sin^{-1}\sqrt{[(n^2-1)/\{n^2-\cos^2(\alpha-\theta F)\cdot\sin^2(2\cdot\gamma)\}]}}$;

$\theta F = \sin^{-1}(1/2\cdot F)$;

α is an angle formed by the optical axis of the light incident on the digital micromirror device and a line normal to the digital micromirror device;
β is an angle formed by a line normal to each of the ON-state micro-mirrors and the line normal to the digital micromirror device;
γ is an angle formed by a line normal to each of the OFF-state micro-mirrors and the line normal to the digital micromirror device;
n is a refractive index of the second prism;
F is an F-number; and
θ1 is an angle formed by the line normal to the digital micromirror device and a line normal to the OFF-light reflecting surface.

6. The optical unit according to claim 5, wherein
the first prism includes an illumination light reflecting surface that reflects the illumination light and transmits the ON light, and
the following conditional expression (2) is satisfied:

$$\theta c \geq \theta 2 \geq \theta d \qquad (2)$$

where:

$\theta c = \sin^{-1}(1/n1) + \sin^{-1}\{\sin(\alpha - \theta F - 2\cdot\beta)/n1\}$;

$\theta d = \sin^{-1}(1/n1) - \sin^{-1}\{\sin(\alpha - \theta F)/n1\}$;

$\theta F = \sin^{-1}(1/2\cdot F)$;

n1 is a refractive index of the first prism; and
θ2 is an angle formed by the line normal to the digital micromirror device and a line normal to the illumination light reflecting surface.

7. The optical unit according to claim 5, wherein
the illumination light emitted from the first prism passes through the third prism and the second prism in this order to be directed to the micro-mirrors,
the ON light reflected from the micro-mirrors is incident on the third prism through the second prism and reflects off an ON-light reflecting surface of the third prism for emission toward the projection side, and
the following conditional expression (3) is satisfied:

$$\theta e \geq \theta 3 \geq \theta h \qquad (3)$$

where:

$\theta e = \sin^{-1}(1/n3) + \sin^{-1}\{\sin(\alpha - \theta F)/n3\}$;

$\theta h = \sin^{-1}(1/n3) - \sin^{-1}\{\sin(\alpha - \theta F - 2\cdot\beta)/n3\}$;

$\theta F=\sin^{-1}(1/2\cdot F)$;

n3 is a refractive index of the third prism; and

θ3 is an angle formed by the line normal to the digital micromirror device and a line normal to the ON-light reflecting surface.

8. The optical unit according to claim 3, wherein
the first prism includes an illumination light reflecting surface that reflects the illumination light and to transmit the ON light, and
the following conditional expression (2) is satisfied:

$$\theta c \geq \theta 2 \geq \theta d \tag{2}$$

where:

$\theta c=\sin^{-1}(1/n1)+\sin^{-1}\{\sin(\alpha-\theta F-2\cdot\beta)/n1\}$;

$\theta d=\sin^{-1}(1/n1)-\sin^{-1}\{\sin(\alpha-\theta F)/n1\}$;

$\theta F=\sin^{-1}(1/2\cdot F)$; α is an angle formed by the optical axis of the light incident on the digital micromirror device and a line normal to the digital micromirror device;

β is an angle formed by a line normal to each of the ON-state micro-mirrors and the line normal to the digital micromirror device;

n1 is a refractive index of the first prism;

F is an F-number; and

θ2 is an angle formed by the line normal to the digital micromirror device and a line normal to the illumination light reflecting surface.

9. The optical unit according to claim 3, wherein
the illumination light emitted from the first prism is directed to the micro-mirrors through the second prism, and
the ON light reflected from the micro-mirrors passes through the second prism, the first prism, and the third prism in this order.

10. The optical unit according to claim 9, wherein the first prism and the second prism are prevented from protruding from an emission surface from where the third prism emits the ON light toward the projection side.

11. The optical unit according to claim 3, wherein
the ON light reflected from the micro-mirrors passes through the first prism, the second prism, and the third prism in this order, and
the OFF light reflected from the micro-mirrors is incident on the second prism through the first prism.

12. The optical unit according to claim 11, wherein the first prism and the second prism are prevented from protruding from an emission surface from where the third prism emits the ON light toward the projection side.

13. The optical unit according to claim 3, wherein
the illumination light incident on the first prism passes through the first prism, the third prism and the second prism in this order to be directed to the micro-mirrors,
the ON light reflected from the micro-mirrors is incident on the third prism through the second prism and reflects off an ON-light reflecting surface of the third prism for emission toward the projection side, and
the following conditional expression (3) is satisfied:

$$\theta e \geq \theta 3 \geq \theta h \tag{3}$$

where:

$\theta e=\sin^{-1}(1/n3)+\sin^{-1}\{\sin(\alpha-\theta F)/n3\}$;

$\theta h=\sin^{-1}(1/n3)-\sin^{-1}\{\sin(\alpha-\theta F-2\cdot\beta)/n3\}$;

$\theta F=\sin^{-1}(1/2\cdot F)$;

α is an angle formed by the optical axis of the light incident on the digital micromirror device and a line normal to the digital micromirror device;

β is an angle formed by a line normal to each of the ON-state micro-mirrors and the line normal to the digital micromirror device;

n3 is a refractive index of the third prism;

F is an F-number; and

θ3 is an angle formed by the line normal to the digital micromirror device and a line normal to the ON-light reflecting surface.

14. The optical unit according to claim 13, wherein the first prism includes an illumination light reflecting surface that reflects the illumination light toward the micro-mirrors.

15. The optical unit according to claim 13, further comprising a mirror member that reflects the illumination light toward the first prism,
wherein the first prism includes a lens part that concentrates and directs toward the digital micromirror device the illumination light reflected from the mirror member.

16. A projector comprising:
a light source;
the optical unit of claim 1;
an illumination optical system that emits the illumination light toward the optical unit; and
a projection optical system that projects an enlarged image displayed on the digital micromirror device onto a screen.

* * * * *